United States Patent

[11] 3,616,249

[72] Inventors John J. Cavallo
Anaheim;
Paul Richard Hines, Yorba Linda, both of Calif.
[21] Appl. No. 740,088
[22] Filed June 26, 1968
[45] Patented Oct. 26, 1971
[73] Assignee Atlantic Richfield Company
Philadelphia, Pa.

[54] PROCESS FOR GROWING YEAST ON HYDROCARBONS
2 Claims, No Drawings

[52] U.S. Cl. ........................................ 195/82, 195/28 R
[51] Int. Cl. .......................................... C12c 11/00
[50] Field of Search ............................. 195/1, 28, 82, 100

[56] References Cited
UNITED STATES PATENTS
3,151,038  9/1964  Gray .......................... 195/32

OTHER REFERENCES
Miller et al., Biotechnology and Bioengineering, Vol. VI, pp. 299–307 (1964).

Primary Examiner—A. Louis Monacell
Assistant Examiner—Seymour Rand
Attorneys—Robert J. Mawhinney and Robert R. Cochran ABSTRACT: A process for improving the rate of growth and protein content of *Candida intermedia* grown on normal alkanes by providing a nutrient solution containing from about 8,000 to about 10,000 micrograms of zinc, as a soluble zinc salt, per liter of nutrient is disclosed.

PROCESS FOR GROWING YEAST ON HYDROCARBONS

BACKGROUND OF THE INVENTION

1. Field of the Invention

This invention relates to biological growth processes and, more particularly, to the production of a high protein food product by the growth of yeast on a hydrocarbon substrate.

2. Description of the Prior Art

It is well known that certain micro-organisms metabolize hydrocarbon compounds. There has recently been considerable interest in developing a process for producing protein containing food for animal and human consumption through microbiological conversion of hydrocarbons.

A number of processes for microbiological conversion by hydrocarbon compounds to protein containing foods have been described. Processes of this class are described, for example, in U.S. Pat. Nos. 3,264,196, 3,268,412, 3,268,413, 3,268,414 and 3,268,419 and South African No. No. 655,843.

Yeasts of the family Cryptococcaceae and particularly of the subfamily Cryptococcoideae are preferred but ascosporogeneous yeasts of the subfamily Saccharomycoideae may be used. General of the Cryptococcoideae subfamily are Torulopsis and Candida are preferred. *Candida Candida pulcherrima*, *Candida utilis*, and *Candida tropicalis* are known to be useful yeasts for producing protein containing food from hydrocarbon substrates. Other micro-organisms which are used in similar processes include bacteria of the family Bacillaceae and Pseudomonadaceae and molds of the family Aspergillaceae.

Apparatus and processes for harvesting the food product are described in the aforementioned patents and an apparatus for carrying out fermentations of this type is described in the patent application of Peter F. Mako, application Ser. No. 723,457, filed Apr. 23, 1968.

The growth rate and the protein production of the yeast *Candida intermedia* has been studied by Miller et al., Biotechnology and Bioengineering, Vol. VI, pp. 299–307 (1964). Miller et al. identified the organism, assigned the number NRRL-y-6328-1 by the Northern Regional Research Laboratory at Peoria, Illinois, as closely resembling *Candida intermedia*. The taxonomy of yeasts including *Candida intermedia* is described by Lodder and Kreger-Van Rij, The Yeasts—A Taxonomic Study, Interscience Publishers, Inc., New York, 1952, and the isolation of *Candida intermedia* is described in the aforementioned references and in the publications cited therein.

Miller et al., supra, studied the growth rate and protein production of *Candida intermedia* on normal alkanes using a nutrient solution which included $ZnSO_4 \cdot 7H_2O$ at a level of 800 micrograms per liter (183 micrograms of zinc per liter). It has now been found that an unexpected increase both in growth rate and in protein production may be achieved by growing the yeast *Candida intermedia* on normal alkanes using a nutrient medium having a greatly increased zinc content.

SUMMARY OF THE INVENTION

The invention comprises a process for growing yeasts, especially yeasts of the species *Candida intermedia*, on normal alkanes in the presence of a nutrient medium containing from about 8,000 to about 10,000 micrograms per liter of zinc, the zinc being present as a soluble nontoxic salt. Accordingly, the principal object of this invention is to provide an improved process for producing high protein food from hydrocarbons.

A more specific object of the invention is to provide a process for increasing the rate of yeast growth on normal alkanes by providing a nutrient medium having a zinc content of from about 8,000 to about 10,000 micrograms per liter.

Another specific object of the invention is to provide an improved process for producing a food product of higher protein content by growing yeast on normal alkanes in the presence of a nutrient medium containing from about 8,000 to about 10,000 micrograms of zinc per liter.

Yet a more specific object of the invention is to provide an improved process for both increasing the rate of growth *Candida intermedia* on normal alkanes and increasing the protein content of the yeast cells by growing the yeast *Candida intermedia* on normal alkanes in the presence of a nutrient medium containing about 9,000 micrograms of zinc per liter.

The specific process described hereinafter constitutes a specific but not a limiting object of the invention. Other objects of the invention will appear from the specification which follows.

DESCRIPTION OF THE PREFERRED EMBODIMENT

The process of this invention is preferably carried out generally according to the process described by Miller et al., supra, and using the organism, *Candida intermedia*, referred to therein.

The process is carried out in a fermentation vessel at a temperature of from about 25° to about 40° C., and preferably about 30° C. Oxygen or an oxygen-containing gas, e.g., air, is used to maintain aerobic conditions in the fermentation reactor.

The process may be carried out on a continuous or batch basis. The pH, in either case, is maintained between pH 4.5 and pH 6.5 and preferably about pH 5.5 by controlled addition of ammonia, preferably as a 5–30 percent aqueous ammonium hydroxide solution.

The substrate hydrocarbon is preferably automatically added to the system in amounts proportional to the ammonium hydroxide level; however, it may be added in increments to give predetermined amounts at certain periods during the fermentation as the substrate present in the reactor is consumed.

The fermentation reaction is carried out in the presence of a nutrient medium containing a source of nitrogen, a source of phosphate, and various trace metals including zinc, preferably present as zinc sulfate. The zinc, however, may be present as any soluble nontoxic salt, such as zinc acetate, zinc acetylacetonate, zinc chloride, zinc citrate, zinc tartrate, etc. Similarly, the trace metals are preferably present as the sulfate or chloride and may be present in any form which is soluble and nontoxic to the organism present in the system.

Under these conditions, fermentation times approached or exceeded 30 hours. The optimum fermentation times are determined by following the rate of growth. Initially, the growth rate is comparatively low. Subsequently, the rate of growth will increase to a higher value, known as the "exponential growth phase" and subsequently the cellular density in the system will become constant as the growth rate diminishes. The yeast cells are normally harvested at or near the end of the exponential growth rate phase.

Under such growth conditions, the crude protein yields were approximately 30 percent using the processes of the prior art, particularly the process described by Miller et al., supra.

It has now been discovered, however, that by increasing the concentration of the zinc in the nutrient medium by approximately fiftyfold, as compared with the zinc level in the nutrient medium of Miller et al., the fermentation time may be decreased with a substantial increase in crude protein yield. For example, Miller et al. found satisfactory growth and protein production to occur when the nutrient medium contained 800 micrograms of $ZnSO_4 \cdot 7H_2O$ corresponding to approximately 183 micrograms of zinc per liter. In contrast, however, it has now been found that a fifty fold increase in zinc content, $4 \times 10^4$ micrograms of $ZnSO_4 \cdot 7H_2O$ (9,120 micrograms of zinc) per liter, in the nutrient medium significantly increases the rate of growth and, in addition, increases the protein content of the yeast produced.

This surprising result is adequately illustrated by the following comparative examples. Two growth media of the following compositions were prepared:

|  | Medium I | Medium II |
|---|---|---|
| $KH_2PO_4$ | 7.5 g. | 7.5 g. |
| $NH_4Cl$ | 7.0 g. | 7.0 g. |
| $CaCl_2 \cdot 2H_2O$ | 0.5 g. | 0.5 g. |
| $MgSO_4 \cdot 7H_2O$ | 3.8 g. | 3.8 g. |
| $CuSO_4 \cdot 5H_2O$ | 80 µg. | 80 µg. |
| KI | 200 µg. | 200 µg. |
| $FeCl_3 \cdot 6H_2O$ | 400 µg. | 400 µg. |
| $MnSO_4 \cdot H_2O$ | 800 µg. | 800 µg. |
| $Na_2MoO_4 \cdot H_2O$ | 400 µg. | 400 µg. |
| $ZnSO_4 \cdot 7H_2O$ | 800 µg. | 40,000 µg. |
| Distilled $H_2O$ | 1,000 ml. | 1,000 ml. |

After adjusting the pH of the media to 5.5, the solutions were sterilized at 248° F. at a pressure of 15 p.s.i.g. for 55 minutes. After cooling, one liter of Medium I was introduced into a sterile 5-liter fermenter. The system was then inoculated with one liter of 48-hour culture of *Candida intermedia* grown on the above medium and 2.8 ml. of an n-alkane mixture containing normal alkanes varying in chain length from $C_{16}$ to $C_{22}$ was introduced. Oxygen at a rate of 0.1 v./v./min. was applied to the system and the liquid phase was agitated by a propeller type impeller rotating at 750 r.p.m. The pH was controlled at from pH 5.5 to pH 5.7 by hourly additions of $NH_4OH$ in amounts varying from 1.1 to 3.5 ml. per hour to a total of 63.1 ml. The hydrocarbon substrate was added simultaneously with the $NH_4OH$ in amounts ranging from 0.7 to 2.3 ml. per hour to a total of 44.6 ml.

The fermentation was allowed to continue until the $NH_4OH$ demand had stopped. The cells were then harvested and submitted for total nitrogen analysis. The fermentation using Medium II was conducted in the same manner. The data obtained from the two experiments and the results of the nitrogen analysis are shown in table I.

It will be apparent from the data shown in table I that in addition to a substantial decrease in fermentation time, there is a significant increase in crude protein yield. The fermentation time was decreased by 26 percent while the crude protein yield was increased by 26 percent using Medium II, with the

TABLE 1

| Run No. | $ZnSO_4$ conc., µg/l | Fermentation time | Cell yield | Total nitrogen | Protein yield |
|---|---|---|---|---|---|
| 1 | 800 | 27 | 82.3% | 6.00% | 30.8% |
| 2 | $4 \times 10^4$ | 20 | 81.3% | 7.58% | 38.5% | high zinc content, as compared with Medium I which essentially corresponds with the medium described by Miller et al., supra.

While these data clearly illustrate the unexpected increase in protein yield even at lower fermentation times for $C_{16}$ to $C_{22}$ n-alkanes, it is clear that similar results would be obtained using the n-alkanes described by Miller et al. Therefore, it is intended that n-alkanes generally and n-alkanes having a chain length of from about $C_{12}$ to about $C_{22}$ in particular be encompassed within the scope of the present invention.

Experimental data available indicate the preferable zinc content in the nutrient medium to be about 9,000 micrograms per liter but advantageous results may be obtained using zinc contents ranging from about 8,000 to about 10,000 micrograms per liter of nutrient medium.

Other variations may be made in the light of the foregoing specification and the prior art without departing from the spirit and scope of the invention as defined in the appended claims.

We claim:

1. In a process for growing *Candida intermedia* on normal alkanes in the presence of nutrient solution for producing a protein containing food, the improvement comprising: inducing more rapid growth of said yeast and higher protein content of said food by including from about 8,000 to about 10,000 micrograms of zinc per liter of nutrient, said zinc being present as a water soluble nontoxic zinc salt.

2. The process of claim 1 wherein the growth process is conducted at a temperature of from 25° to about 40° C. and the pH of the nutrient is from about 4.5 to about 6.5.